United States Patent [19]
Finn et al.

[11] Patent Number: 5,737,836
[45] Date of Patent: Apr. 14, 1998

[54] METHOD OF MAKING A SPLINED TURBINE HUB

[75] Inventors: James W. Finn, Macomb; Christopher Sullivan, Warren; Michael J. McCarthy, Rochester Hills, all of Mich.

[73] Assignee: Borg-Warner Automotive, Inc., Sterling Heights, Mich.

[21] Appl. No.: 644,840

[22] Filed: May 3, 1996

[51] Int. Cl.$^6$ .................................................. B23C 15/00
[52] U.S. Cl. ................................. 29/889.5; 29/557
[58] Field of Search .......................... 29/889.5, 557, 29/894.362; 72/361.352

[56] References Cited

U.S. PATENT DOCUMENTS

| | | |
|---|---|---|
| 2,917,816 | 12/1959 | Samson .............................. 29/894.362 |
| 4,651,548 | 3/1987 | Bernet . |
| 4,694,941 | 9/1987 | Hall et al. . |
| 4,844,222 | 7/1989 | Casse et al. . |
| 4,986,398 | 1/1991 | Olsen . |
| 5,123,157 | 6/1992 | Cerny . |
| 5,127,253 | 7/1992 | Takahara et al. ...................... 72/352 |
| 5,129,493 | 7/1992 | Edmunds . |
| 5,137,132 | 8/1992 | Cerny . |
| 5,152,061 | 10/1992 | Himmeroeder . |
| 5,186,292 | 2/1993 | Hageman et al. . |
| 5,203,223 | 4/1993 | Himmeroeder . |
| 5,237,744 | 8/1993 | Himmeroeder . |
| 5,282,362 | 2/1994 | Renneker et al. . |
| 5,337,867 | 8/1994 | Kirkwood . |
| 5,384,949 | 1/1995 | Wodrich et al. ........................... 29/557 |
| 5,404,640 | 4/1995 | Himmeroeder . |
| 5,405,296 | 4/1995 | Cerny et al. . |
| 5,462,145 | 10/1995 | Gimmler . |
| 5,465,575 | 11/1995 | Shimmell . |
| 5,619,879 | 4/1997 | Friese .................................. 29/894.362 |
| 5,619,882 | 4/1997 | Godtner ................................ 72/361 |

FOREIGN PATENT DOCUMENTS

| | | |
|---|---|---|
| 61-235033 | 4/1985 | Japan . |
| 60-184444 | 9/1995 | Japan . |

*Primary Examiner*—Irene Cuda
*Attorney, Agent, or Firm*—Bliss McGlynn, P.C.; Greg Dziegielewski

[57] ABSTRACT

A method of making a splined hub for use in a hydrodynamic torque converter includes the steps of preparing a cylindrical workpiece for forging, forging a plurality of splines on at least a portion of the cylindrical workpiece by applying a deformation force progressively across the circumference of the workpiece such that the splines extend in an axial direction relative to the workpiece and about at least a portion of the cylindrical surface thereof and hardening the forged workpiece.

19 Claims, 2 Drawing Sheets

METHOD OF MAKING A SPLINED TURBINE HUB

BACKGROUND OF THE INVENTION

1. Field of the Invention

The present invention relates, generally, to a method of making a splined hub and, more specifically, to a method of making a splined turbine hub for use in a hydrodynamic torque converter.

2. Description of the Related Art

In automotive applications, engine torque and speed are translated between a prime mover, such as an internal combustion engine, to one or more wheels through the transmission in accordance with the tractive power demand of the vehicle. Torque converters are often employed between the internal combustion engine and its associated transmission.

Hydrodynamic torque converters can include torque input members and an impeller assembly operatively connected for rotation with the torque input member. A turbine assembly is fluidly connected in driven relationship with the impeller assembly. The turbine assembly includes a hub, a turbine shell mounted to the hub and a plurality of turbine blades carried by the turbine shell. A lock-up clutch assembly is supported for rotation with the turbine assembly and is interposed between the turbine assembly and the torque input member.

In addition, the torque converter may include a torsional damper which operatively interconnects the turbine assembly and the lock-up clutch assembly. In some cases, either the lock-up clutch assembly, the torsional damper, or both, are movable relative to the turbine hub to engage the torque input member to provide damped, direct torque translation between the torque input member and the turbine assembly. To facilitate this operation, the turbine hub is often provided with a plurality of splines axially extending relative to the turbine hub and parallel to the direction of movement of either the lock-up clutch assembly or the torsional damper, which ever the case may be. Similarly, the lock-up clutch assembly or torsional damper will include corresponding structure such that they are slidingly and movably supported on the splined surface of the turbine hub.

Unfortunately, while splined surfaces facilitate the smooth operation of the lock-up clutch assembly and torsional damper, they are relatively expensive to machine onto a cylindrical surface of the hub. More specifically, the splines on a turbine hub used in a torque converter are engineered to sustain substantial forces which can be imposed thereon during the operation of such a device. Thus, such splines are typically required to be thick and hard. Prior to the advent of the present invention, such splines were machined into a cylindrical surface of a forged hub workpiece using a shaper/cutter. The process of manufacturing splines into the hubs of the related art suffers from the disadvantage that the operation of the shaper/cutter which forms the splines is a relatively slow and expensive process requiring up to five minutes of machining per hub. In an ever increasing competitive environment were there exists an almost continuous demand for cost reduction, the processes of the related art stand out for their time consuming and costly attributes.

Thus, there is a need in the art for a method of manufacturing a splined hub which is strong and has sufficient operating life and which, at the same time, results in cost reduction over the methods used to manufacturing such hubs in the related art.

SUMMARY OF THE INVENTION

The present invention overcomes the disadvantages in the related art in a method of manufacturing a splined hub for use in a hydrodynamic torque converter. The method includes the steps of preparing a cylindrical workpiece for forging and forging a plurality of splines on at least a portion of the cylindrical workpiece by applying a deformation force progressively across the circumference of the workpiece such that the splines extend in an axial direction relative to the workpiece and about at least a portion of the cylindrical surface thereof. In addition, the method includes the steps of hardening the forged workpiece.

In this way, the splines on the hub are formed in a forging process to their net shape without the additional steps of machining using a shaper/cutter. The method of the present invention eliminates three time consuming and expensive manufacturing steps used to form such splines in the related art and significantly reduces the cost of manufacturing the splined hub. The forged splines manufactured according to the method of the present invention are strong and hard and facilitate the movement of the lock-up clutch and torsional damper relative to the turbine hub in hydrodynamic torque converter.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
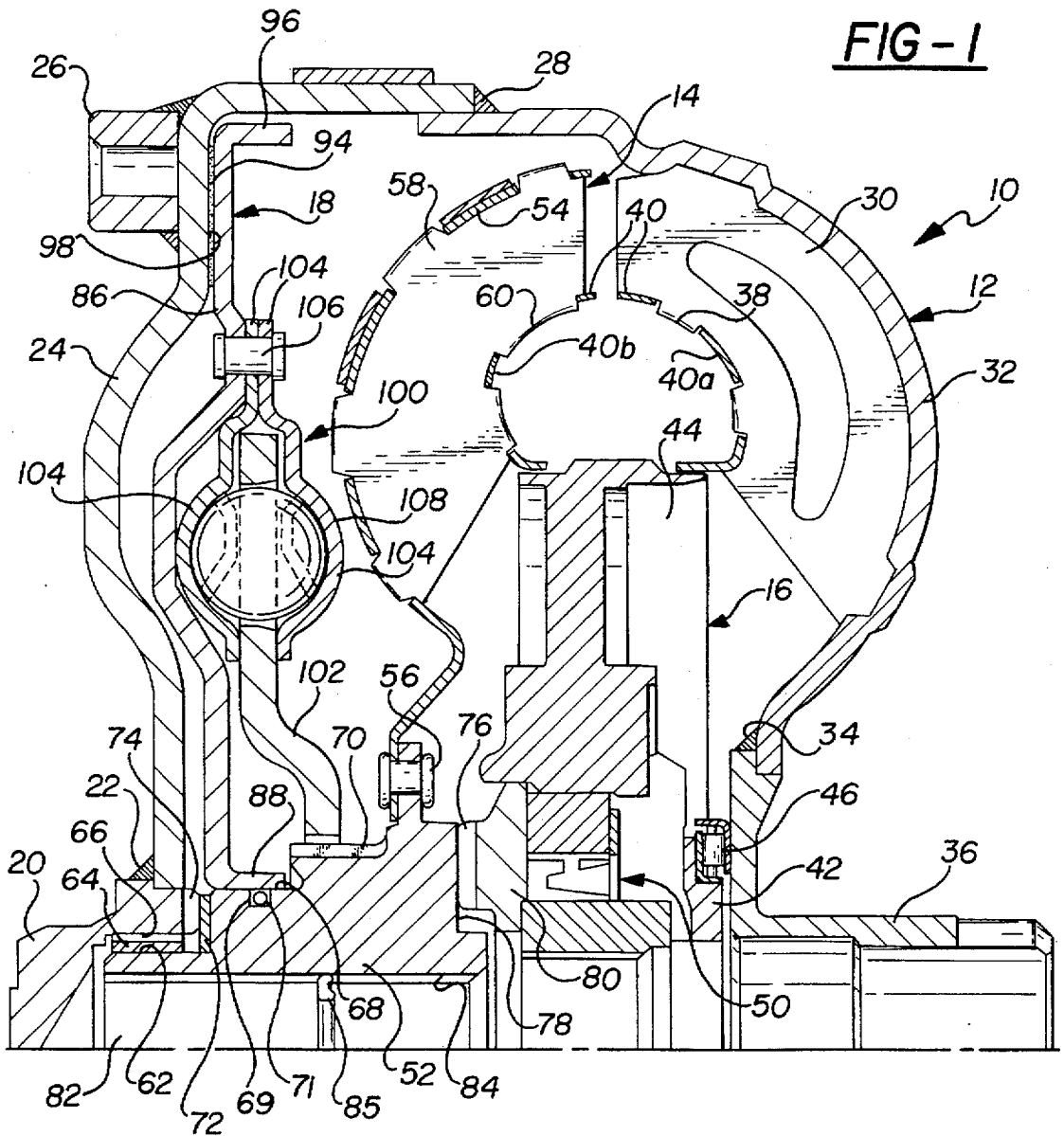
FIG. 1 is a partial cross-sectional side view of a torque converter.

Referring now the Figures, where like numerals are used to describe like structure throughout the drawings, a hydrodynamic torque converter for translating torque from a prime mover such as an internal combustion engine (not shown) to the input shaft of a transmission is generally shown at 10. The transmission may then subsequently distribute this power to one or more wheels (not shown) through other drive train components such as a drive shaft and an axle having a differential (also not shown). While the torque converter illustrated in the Figures is particularly adapted for use with an automotive vehicle, those skilled in the art will appreciate that the torque converter may be employed in connection with other types of transmissions.

The torque convertor 10 includes an impeller assembly, generally indicated at 12, a turbine assembly generally indicated at 14, a stator assembly generally indicated at 16, an a lock-up clutch assembly generally indicated at 18. Each of these assemblies will be described in greater detail below.

Power is transmitted from a rotating crankshaft (not shown) of the engine to a torque input member 20 which is welded at 22 to the front cover 24 of the torque converter. The front cover 24 may include a plurality of input drive lugs or threaded connectors 26. A rotatable plate member (not shown) is typically secured to the front cover member 24 by suitable fastening means such as bolts (not shown)

which are received in the connectors 26 as is commonly known in the art. The front cover 24 is secured, typically by welding as indicated at 28, to the impeller assembly 12 of the hydrodynamic torque converter 10.

The impeller assembly 12 is fluidly connected in torsional flow relationship in a known manner with the turbine assembly 14 and the stator assembly 16. The impeller assembly 12 includes a plurality of annularly spaced impeller blades 30 connected to the inside of an impeller shell 32. The impeller shell 32 is fixed, as for example by welding at 34, to an impeller hub or pump drive shaft 36. The impeller hub 36 may drive a pump (not shown) from which fluid is supplied to the hydrodynamic torque converter 10. The impeller blades 30 have arcuate inner portions 38 which are fixed to one half 40a of a split core ring 40. The structure of the split core ring 40 aids in directing fluid flow within the hydrodynamic torque converter 10 as is commonly known in the art.

The stator assembly 16 is interposed between the impeller assembly 12 and the turbine assembly 14 and includes a stator hub 42 and a plurality of stator vanes 44 spaced circumferentially about the stator hub 42. An annular needle roller bearing 46 isolates the stator hub 42 from the impeller hub 36. The stator assembly 16 includes a one way clutch assembly, generally indicated at 50, for allowing the stator hub 46 and the stator vanes 44 to rotate in the direction of rotation of the impeller assembly 12 and the turbine assembly 14 and lock in the opposite rotational direction.

The turbine assembly 14 is fluidly connected in driven relationship with the impeller assembly 12. The turbine assembly 14 includes an annular turbine hub 52 which is operatively connected to the input of the transmission. A turbine shell 54 is mounted to the turbine hub 52 via rivets 56 or some other suitable fastener. A plurality of turbine blades 58 are carried by the turbine shell 54 as will be described in greater detail below. As with the impeller blades 30, the turbine blades 58 include arcuate inner portions 60 which are fixed to the other half 40b of the split core ring 40.

The annular turbine hub 52 presents a plurality of stepped annular surfaces. More specifically, the hub 52 includes a stub portion 62 which is surrounded by an annular, steel backed, bronze bushing 64. The bushing 64 is disposed between the stub portion 62 and the inner diameter 66 of the torque input member 20. A piston bearing surface 68 is located on the next stepped annular surface and between the stub portion 62 and the annular surface presenting a plurality of axially extending splines 70. This piston bearing surface 68 includes an annular notch 69 which receives a sealing member 71 therein. An annular thrust washer 72 is disposed at the step between the stub portion 62 and the piston bearing surface 68 and interfaces with the end 74 of the torque input member 20. Similarly, a phenolic thrust bearing 76 is disposed between the back 78 of the hub 52 and a cage 80 of the one way clutch assembly 50. The hub 52 also includes centrally disposed passage 82 extending axially through the hub 52 and which defines an inner diameter thereof. Internal splines 84 are formed on the passage 82 and are employed to secure the hub 52 to an input shaft (not shown) of the transmission. A lip seal 85 is pressed into the passage 82 and located adjacent one end of the internal splines 84.

The lock-up clutch assembly 18 is supported for rotation with the turbine assembly 14 and interposed between the turbine assembly 14 and the front cover The lock-up clutch assembly 18 includes an annular piston 86 having an inner flange 88 which corresponds to the annular piston bearing surface 68 on the turbine hub 52. An annular disk shaped frictional element 94 is carried proximate to the outer peripheral flange 96 of the piston 86. The piston 86 is rotatably supported for axial movement on the piston bearing surface 68 of the turbine hub 52 into and out of engagement with the inner surface 98 of the front cover 24 to provide direct torque translation between the front cover 24 and the turbine assembly 14 as will be discussed in greater detail below.

The hydrodynamic torque converter 10 further includes a torsional damper, generally indicated at 100, which operatively interconnects the turbine assembly 14 and the lock-up clutch assembly 18. The torsional damper acts to dampen torsional vibrations due to impact loads and pulsations generated between the turbine assembly 14 and the piston 86 of the lock-up clutch assembly 18 in the torque converter.

The torsional damper 100 includes a hub plate 102 which is movably supported on the axially extending splines 70 of the turbine hub 52. A split retainer plate 104 is fixedly secured to the lock-up clutch piston 86 through rivets 106. The split retainer plate 104 acts to constrain coiled springs 108. The coiled springs 108 act between the split retainer plate 104 and the hub plate 102 to damping torsional forces generated between the turbine assembly 14 and lock-up clutch assembly 18.

OPERATION OF THE TORQUE CONVERTER

Rotation of the crankshaft of the engine causes torque input member 20 and thus the front cover 24 to rotate. The front cover 24 is welded at 28 to the impeller shell 32 and so the impeller assembly 12 also rotates with the crankshaft. The fluid within the impeller assembly 12 is set into motion by the rotation of the impeller assembly 12 which is kept filled by the fluid pressure from a pump (not shown). The impeller blades 30 start to carry the fluid around with them. As the fluid is spun around by the impeller blades 30, it is thrown outward by centrifugal force and into the turbine assembly 14 at an angle. The fluid strikes the turbine blades 58 of the turbine assembly 14, thus imparting torque or turning effort on the turbine assembly 14 and causing the turbine shell 54 to rotate. The turbine shell 54 is connected by rivets 56 to the turbine hub 52. The turbine hub 52 is, in turn, operatively splined at 84 to the input of the transmission.

During downshifted operation of the hydrodynamic torque converter 10, piston 86 of the lock-up clutch assembly 18 does not apply. Thus, torque is imparted to the input of the transmission via the turbine assembly 14. However, during normal upshifted operation of the hydrodynamic torque converter 10 of the present invention, the piston 86 is applied. The fluid pushes the piston 86 against the front cover 24 with the friction disk 94 sandwiched between the two elements. Thus, flange 88 moves relative to piston bearing surface 68. The flow of power or engine torque is then transmitted through the front cover 24, the lock-up piston 86 directly to the turbine hub 52 and thus the input to the transmission. Thus, the front cover 24, lock-up clutch assembly 18, turbine assembly 14 and the input of the transmission rotate together.

The actuation of the piston 86 into engagement with the front cover 24 generates impact loads, pulsations and thus vibration between the turbine assembly 14 and the piston 86. The torsional damper 100 acts to dampen these forces. When the piston 86 moves to the left as viewed in FIG. 1, the return plate 104 and thus the hub plate 102 move with it. To that end, the hub plate 102 is slidingly supported on the splines 70 of the hub 52. The coiled springs 108 provide a predetermined amount of relative movement between the turbine assembly and the lock-up clutch assembly 18 resulting in an overall torsional damping effect therebetween.

METHOD OF MAKING THE SPLINED TURBINE HUB

Figure 2:
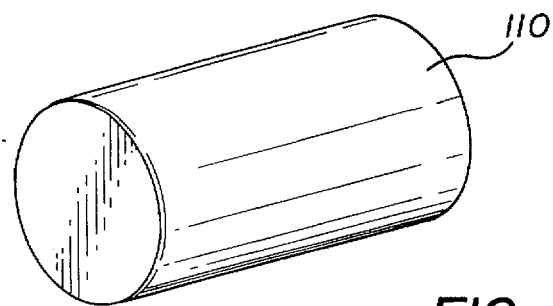
FIG. 2 is a perspective view of a cylindrical workpiece.

The present invention is directed toward a method of making a splined hub and, more specifically, a method of making a splined turbine hub for use in a hydrodynamic torque converter. With reference to FIG. 2, the method includes the step of preparing a cylindrical workpiece 110 in preparation for forging. The step of preparing the cylindrical workpiece 110 includes machining the workpiece to a predetermined diameter and polishing the workpiece 110. The workpiece 110 may be machined by turning the workpiece in a screw machine or lathe. The step of polishing the workpiece 110 may be accomplished by micropolishing the workpiece to achieve a predetermined flow characteristic of the metal workpiece in the step of forging the workpiece to be described hereinafter. In addition, the workpiece is cut to a predetermined length prior to forging.

Figure 3:
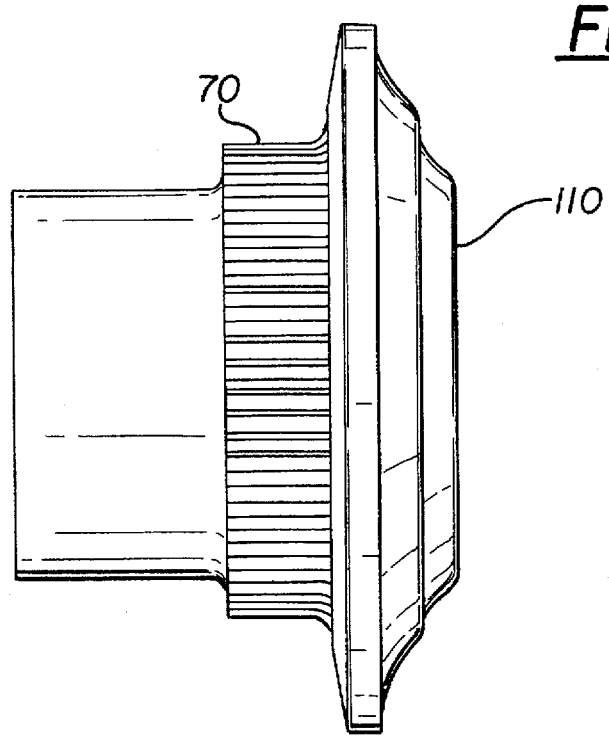
FIG. 3 is a side view of the workpiece following the forging operation of the method of the present invention.
Figure 4:
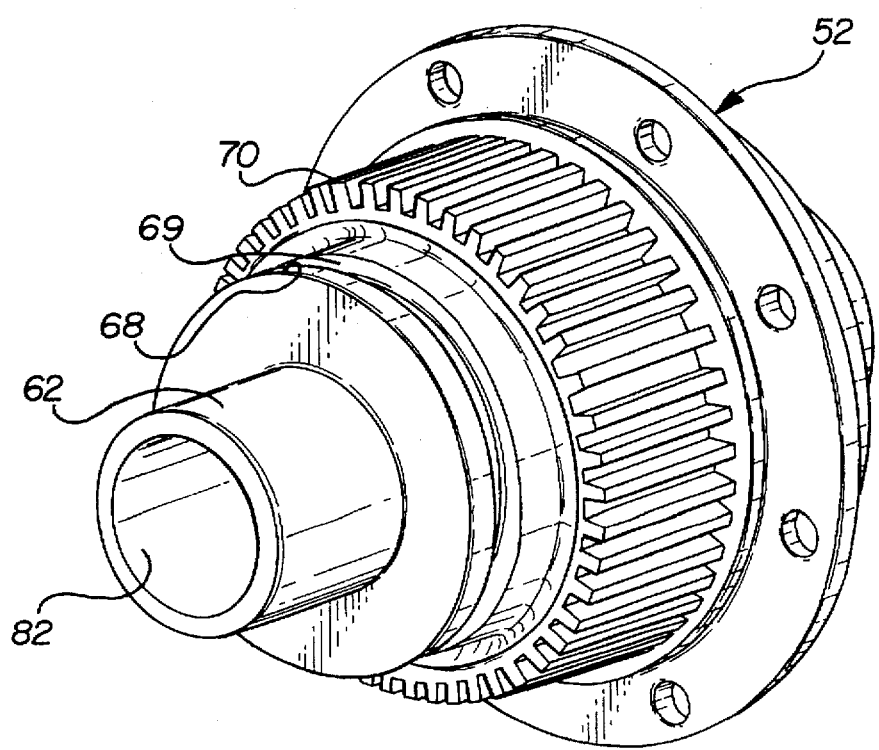
FIG. 4 is a perspective view of the hub which is produced pursuant to the method of the present invention.

The method also includes a step of forging a plurality of splines 70 on at least a portion of the cylindrical workpiece 110 by applying a deformation force progressively across the circumference of the workpiece 110 such that the splines 70 extend in an axial direction relative to the workpiece 110 and about at least a portion of the cylindrical surface thereof. Thus, the splines 70 are formed to their net shape as shown in FIG. 3. This is accomplished with the aid of an orbital cold forging machine. No machining is required to form the splines 70 and thus at least three manufacturing steps usually employed in the related art to define the splines to their net shape are eliminated.

Next, the workpiece 110 is hardened. The step of hardening the workpiece 110 includes heat treating the workpiece to a hardness of between 28 and 32 on the Rockwell C scale. The method also includes the steps of machining a piston bearing surface 68 on another portion of the workpiece 110 for receiving a cooperating flange 88 of the lock-up piston 86. Furthermore, the method includes a step of machining an annular notch 69 in the piston bearing surface 68 and placing a sealing member 71 in the annular notch 69. The method also includes a step of machining a stub portion 62 on the workpiece 110. Next, an axially extending passage 82 is defined centrally through the workpiece 110. Furthermore, a plurality of internal splines 84 are defined which extend axially along at least a portion of the passage 82. The axially extending centrally disposed passage 82 and internal splines 84 are formed by broaching the workpiece 110. A lip seal 85 is then inserted into the passage 82 and adjacent the internal splines 84. All miscellaneous surfaces and holes are also machined and drilled and these specific operations are dictated by the specific structure of the hub and its surrounding associated components.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of making a splined hub, said method comprising the steps of:

preparing a cylindrical workpiece for forging;

forging a plurality of splines on at least a portion of the cylindrical workpiece by applying a deformation force progressively across the circumference of the cylindrical workpiece such that each of the plurality of splines extends in an axial direction relative to the workpiece and about at least a portion of the cylindrical surface thereof;

machining a piston bearing surface on another portion of the workpiece for receiving a cooperating flange of a clutch piston; and hardening the cylindrical workpiece.

2. A method of making a splined turbine hub for use in a hydrodynamic torque converter, said method comprising the steps of:

preparing a cylindrical workpiece for forging;

forging a plurality of splines on at least a portion of the cylindrical workpiece by applying a deformation force progressively across the circumference of the cylindrical workpiece such that each of the plurality of splines extends in an axial direction relative to the workpiece and about at least a portion of the cylindrical surfaces thereof;

heat treating the cylindrical workpiece to a hardness of between 28 and 32 on the Rockwell C scale to harden the workpiece;

machining a piston bearing surface on another portion of the workpiece for receiving a cooperating flange and a clutch piston;

machining a stub portion on the workpiece; and defining an axially extending passage centrally through the workpiece and having a plurality of internal splines extending axially along at least a portion of the passage.

3. A method as set forth in claim 1 wherein the step of machining a piston bearing surface includes the step of machining an annular notch in the piston bearing surface.

4. A method as set forth in claim 3 including the step of placing a sealing member in the annular notch in the piston bearing surface.

5. A method as set forth in claim 1 including the steps of machining a stub portion on the workpiece.

6. A method as set forth in claim 1 including the step of defining an axially extending passage centrally through the workpiece.

7. A method as set forth in claim 6 including the steps of defining a plurality of internal splines extending axially along at least a portion of the passage.

8. A method as set forth in claim 7 including the step of inserting a lip seal into the passage and adjacent the internal splines.

9. A method as set forth in claim 7 wherein the step of defining an axially extending passage and defining a plurality of internal splines includes the step of broaching the workpiece.

10. A method as set forth in claim 1 wherein the step of preparing the workpiece further includes the step of cutting the workpiece to a predetermined length.

11. A method as set forth in claim 1 wherein the step of preparing a cylindrical workpiece includes a step of machining the workpiece to a predetermined diameter and polishing the workpiece.

12. A method as set forth in claim 11 wherein the step of machining the workpiece includes turning the workpiece on a screw machine.

13. A method as set forth in claim 11 wherein the step of machining the workpiece includes turning the workpiece on a lathe.

14. A method as set forth in claim 11 wherein the step of polishing the workpiece includes the step of micropolishing the workpiece to achieve a predetermined flow characteristic of the metal workpiece in the step of forging the workpiece.

15. A method as set forth in claim 1 wherein the step of hardening the workpiece includes the step of heat treating the workpiece to a hardness of between 28 and 32 on the Rockwell C scale.

16. A method as set forth in claim 2 wherein the step of machining a piston bearing surface includes the step of machining an annular notch in the piston bearing surface.

17. A method as set forth in claim 16 including the step of placing a sealing member in the annular notch in the piston bearing surface.

18. A method as set forth in claim 2 wherein the step of preparing a cylindrical workpiece includes the step of machining the workpiece to a predetermined diameter and polishing the workpiece.

19. A method as set forth in claim 18 wherein the step of polishing the workpiece includes the step of micropolishing the workpiece to achieve a predetermined flow characteristic of the metal workpiece in the step of forging the workpiece.

* * * * *